US 9,001,386 B2

(12) United States Patent
Sugawara (10) Patent No.: US 9,001,386 B2
(45) Date of Patent: Apr. 7, 2015

(54) IMAGE FORMING APPARATUS PERFORMING TRAPPING PROCESS WHEN PRINT DATA INCLUDES A PLURALITY OF PIECES OF IMAGE DATA AND TO SUPERPOSE THE ADJACENT PIECES OF IMAGE DATA AND A DETERMINATION UNIT THAT DETERMINES WHETHER OR NOT TRAPPING ATTRIBUTE INFORMATION, WHICH INDICATES THAT THE TRAPPING PROCESS IS TO BE PERFORMED, IS ATTACHED TO THE PIECES OF IMAGE DATA ON A PIECE BY PIECE BASIS OF PERFORMED COLOR CORRECTION

(71) Applicant: Fuji Xerox Co., Ltd., Minato-ku, Tokyo (JP)

(72) Inventor: Masafumi Sugawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/332,845

(22) Filed: Jul. 16, 2014

(65) Prior Publication Data
US 2015/0049353 A1 Feb. 19, 2015

(30) Foreign Application Priority Data

Aug. 14, 2013 (JP) ................. 2013-168557

(51) Int. Cl.
*G06K 1/00* (2006.01)
*H04N 1/60* (2006.01)
*G06K 15/02* (2006.01)
*G06K 9/00* (2006.01)

(52) U.S. Cl.
CPC .......... *H04N 1/6027* (2013.01); *G06K 15/1826* (2013.01)

(58) Field of Classification Search
None
See application file for complete search history.

(56) References Cited

U.S. PATENT DOCUMENTS

| 5,581,667 | A | * | 12/1996 | Bloomberg | .................... 358/1.9 |
| 6,120,197 | A | | 9/2000 | Kawamoto et al. | |
| 8,139,858 | B1 | * | 3/2012 | Landwehr et al. | ............. 382/170 |
| 2005/0195423 | A1 | * | 9/2005 | Sawano | ........................ 358/1.14 |
| 2010/0128314 | A1 | * | 5/2010 | Loce et al. | .................... 358/3.06 |
| 2010/0177355 | A1 | * | 7/2010 | Lacagnina et al. | ........... 358/3.06 |
| 2011/0188088 | A1 | * | 8/2011 | Kawano | ....................... 358/3.06 |

FOREIGN PATENT DOCUMENTS

| JP | 9-193477 A | 7/1997 |
| JP | 10-285421 A | 10/1998 |
| JP | 2004-122692 A | 4/2004 |

\* cited by examiner

*Primary Examiner* — Steven Kau
(74) *Attorney, Agent, or Firm* — Sughrue Mion, PLLC (57) ABSTRACT

An image forming apparatus performs a trapping process. The image forming apparatus includes an image processing unit that includes a determination unit, a color correction unit, a processing unit, an adding unit, and a generating unit. The processing unit performs the trapping process on the pieces of image data, on which the color correction has been performed by the color correction unit. The generating unit generates intermediate data in accordance with the print data including the pieces of image data, on which the trapping process has been performed. The image forming apparatus also includes a rendering unit that performs a rendering process on one or more of the pieces of image data on which the color correction has been performed by the rendering unit and on the pieces of image data for which tag information indicates that the color correction has been performed.

4 Claims, 13 Drawing Sheets

| TAG INFORMATION | | | |
|---|---|---|---|
| COLOR PROCESSING MODE | TYPE | CORRECTED | COLOR SPACE |
| EEEE EEEE | OOO | C | SSSS |

|  | CYAN | MAGENTA | YELLOW | BLACK |
|---|---|---|---|---|
| REAR IMAGE 101 | 100 | 0 | 0 | 0 |
| FRONT IMAGE 102 | 0 | 100 | 0 | 0 |
| TRAPPING OBJECT 104 | 100 | 100 | 0 | 0 |

FIG. 12B

|  | CYAN | MAGENTA | YELLOW | BLACK |
|---|---|---|---|---|
| REAR IMAGE 101 | 89 | 0 | 3 | 0 |
| FRONT IMAGE 102 | 0 | 97 | 1 | 0 |
| TRAPPING OBJECT 104 | 94 | 79 | 0 | 0 |

FIG. 13A

|  | CYAN | MAGENTA | YELLOW | BLACK |
|---|---|---|---|---|
| REAR IMAGE 101 | 100 | 0 | 0 | 0 |
| FRONT IMAGE 102 | 0 | 100 | 0 | 0 |

FIG. 13B

|  | CYAN | MAGENTA | YELLOW | BLACK |
|---|---|---|---|---|
| REAR IMAGE 101 | 89 | 0 | 3 | 0 |
| FRONT IMAGE 102 | 0 | 97 | 1 | 0 |
| TRAPPING OBJECT 104 | 89 | 97 | 3 | 0 |

IMAGE FORMING APPARATUS PERFORMING TRAPPING PROCESS WHEN PRINT DATA INCLUDES A PLURALITY OF PIECES OF IMAGE DATA AND TO SUPERPOSE THE ADJACENT PIECES OF IMAGE DATA AND A DETERMINATION UNIT THAT DETERMINES WHETHER OR NOT TRAPPING ATTRIBUTE INFORMATION, WHICH INDICATES THAT THE TRAPPING PROCESS IS TO BE PERFORMED, IS ATTACHED TO THE PIECES OF IMAGE DATA ON A PIECE BY PIECE BASIS OF PERFORMED COLOR CORRECTION

CROSS-REFERENCE TO RELATED APPLICATIONS

This application is based on and claims priority under 35 USC 119 from Japanese Patent Application No. 2013-168557 filed Aug. 14, 2013.

BACKGROUND

Technical Field

The present invention relates to an image forming apparatus.

SUMMARY

According to an aspect of the present invention, there is provided an image forming apparatus including an image processing unit and a rendering unit, in which the image forming apparatus performs a trapping process that, when print data includes a plurality of pieces of image data, causes boundary portions of the adjacent pieces of image data to be superposed with one another. The image processing unit includes a determination unit that determines whether or not trapping attribute information, which indicates that the trapping process is to be performed, is attached to the pieces of image data on a piece by piece basis, a color correction unit that performs color correction on the pieces of image data, for which it has been determined by the determination unit that the trapping attribute information is attached, a processing unit that performs the trapping process on the pieces of image data, on which the color correction has been performed by the color correction unit, an adding unit that adds tag information, which includes a piece of information indicating whether or not the color correction has been performed by the color correction unit, to each of the plurality of pieces of image data included in the print data, and a generating unit that generates intermediate data in accordance with the print data that includes the pieces of image data, on which the trapping process has been performed by the processing unit. The rendering unit refers to the tag information of each of the pieces of image data in the intermediate data generated by the intermediate data generating unit, performs the color correction on one or more of the pieces of image data to which the tag information, which includes the piece of information indicating that the color correction has not been performed, has been added, and performs a rendering process on the one or more of the pieces of image data on which the color correction has been performed and on the pieces of image data to which the tag information, which includes the piece of information indicating that the color correction has been performed, has been added.

BRIEF DESCRIPTION OF THE DRAWINGS

Exemplary embodiment of the present invention will be described in detail based on the following figures, wherein.

DETAILED DESCRIPTION

Next, an exemplary embodiment of the present invention will be described in detail with reference to the drawings.

Figure 1:
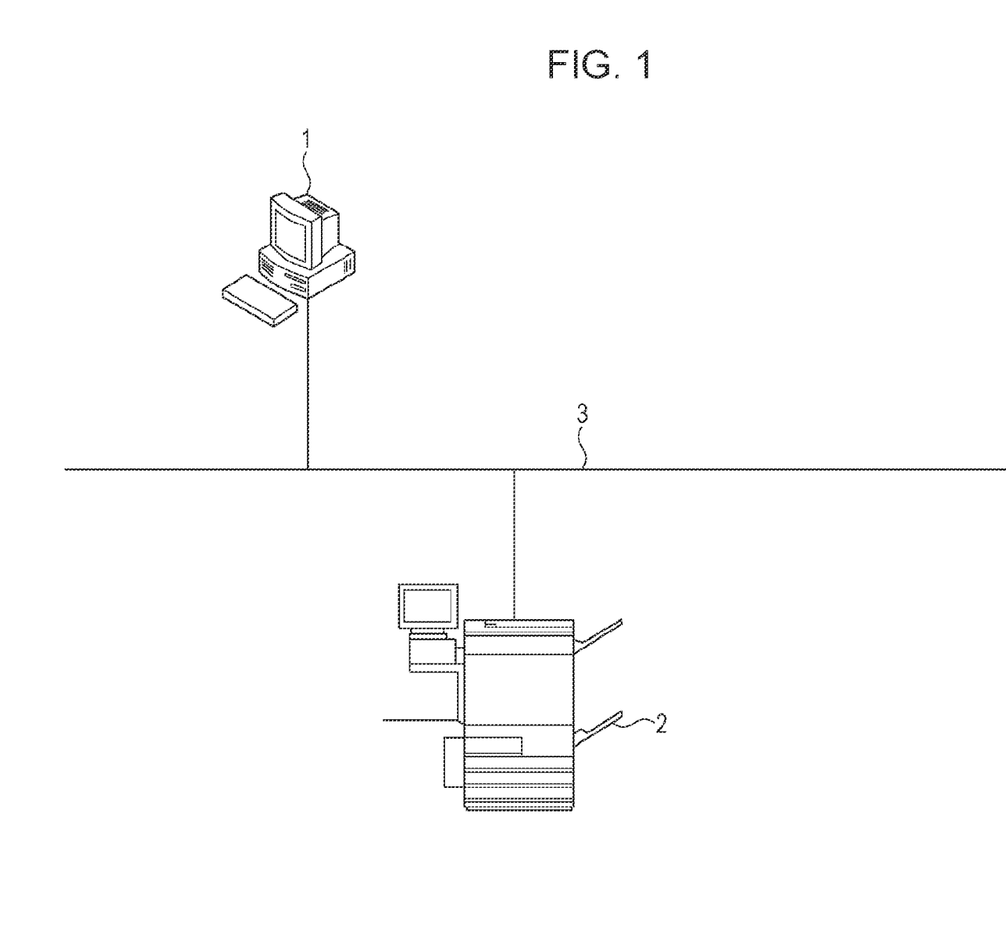
FIG. 1 illustrates an image forming system according to an exemplary embodiment of the present invention.

FIG. 1 illustrates an image forming system according to an exemplary embodiment of the present invention.

As illustrated in FIG. 1, a terminal apparatus 1 and an image forming apparatus 2 are connected to each other via a network 3 in the image forming system according to the present exemplary embodiment.

The terminal apparatus 1 creates print data that includes plural pieces of image data and transmits this print data to the image forming apparatus 2 via the network 3.

The image forming apparatus 2 outputs an image to a sheet of paper or the like in accordance with the print data transmitted from the terminal apparatus 1 via the network 3.

Next, a hardware configuration of the image forming apparatus 2 according to the present exemplary embodiment is described with reference to FIG. 2.

Figure 2:
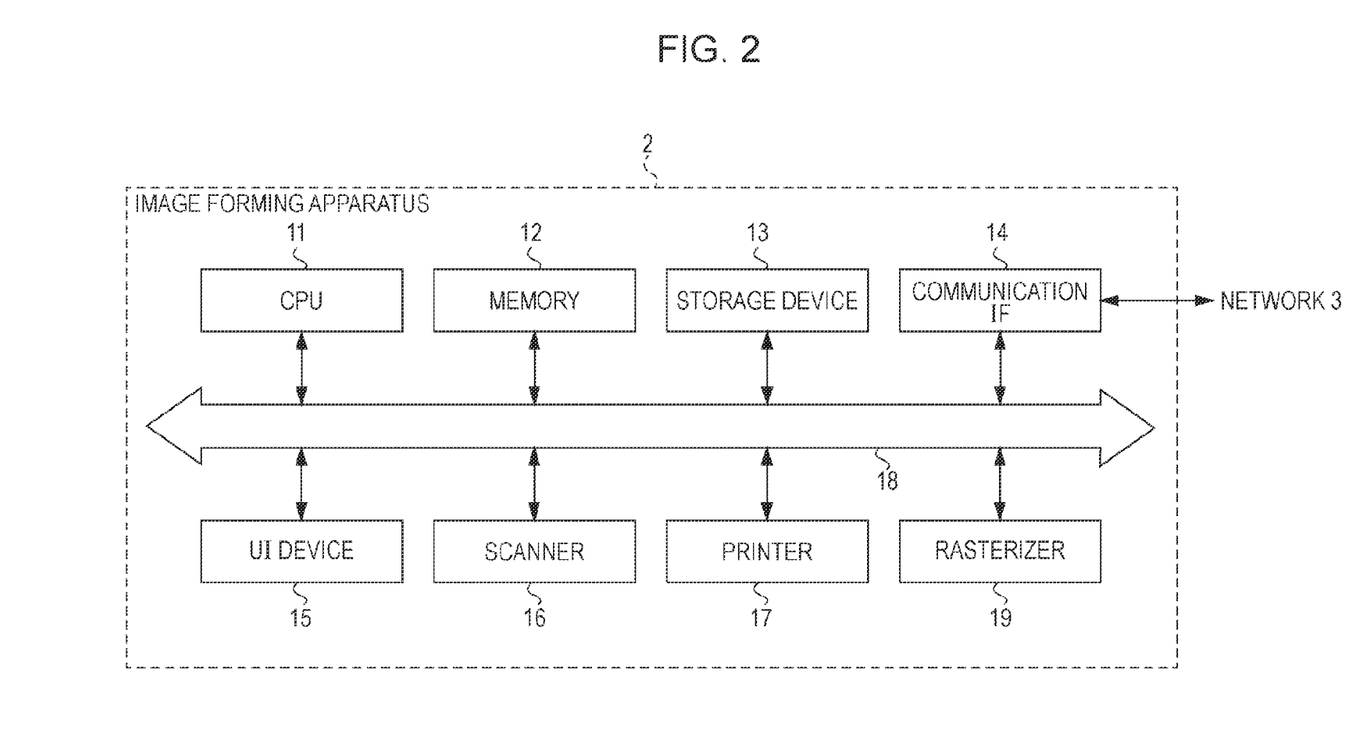
FIG. 2 is a block diagram illustrating a hardware configuration of an image forming apparatus according to the exemplary embodiment of the present invention.

As illustrated in FIG. 2, the image forming apparatus 2 includes a central processing unit (CPU) 11, a memory 12, a storage device 13 such as a hard disc drive (HDD), a communication interface (IF) 14, a user interface (UI) device 15, a scanner 16, a printer 17, and a rasterizer 19. The communication IF 14 transmits data to and receives data from external equipment or the like via the network 3. The UI device 15 includes a touch panel or a liquid crystal display. These components are connected to one another via a control bus 18.

The CPU 11 executes specified processes in accordance with a control program stored in the memory 12 or the storage device 13 so as to control operation of the image forming apparatus 2. Although the CPU 11 reads and executes the control program stored in the memory 12 or the storage device 13 in the present exemplary embodiment, the control program may be stored in a storage medium such as a compact-disc read-only memory (CD-ROM) and supplied to the CPU 11.

Figure 3:
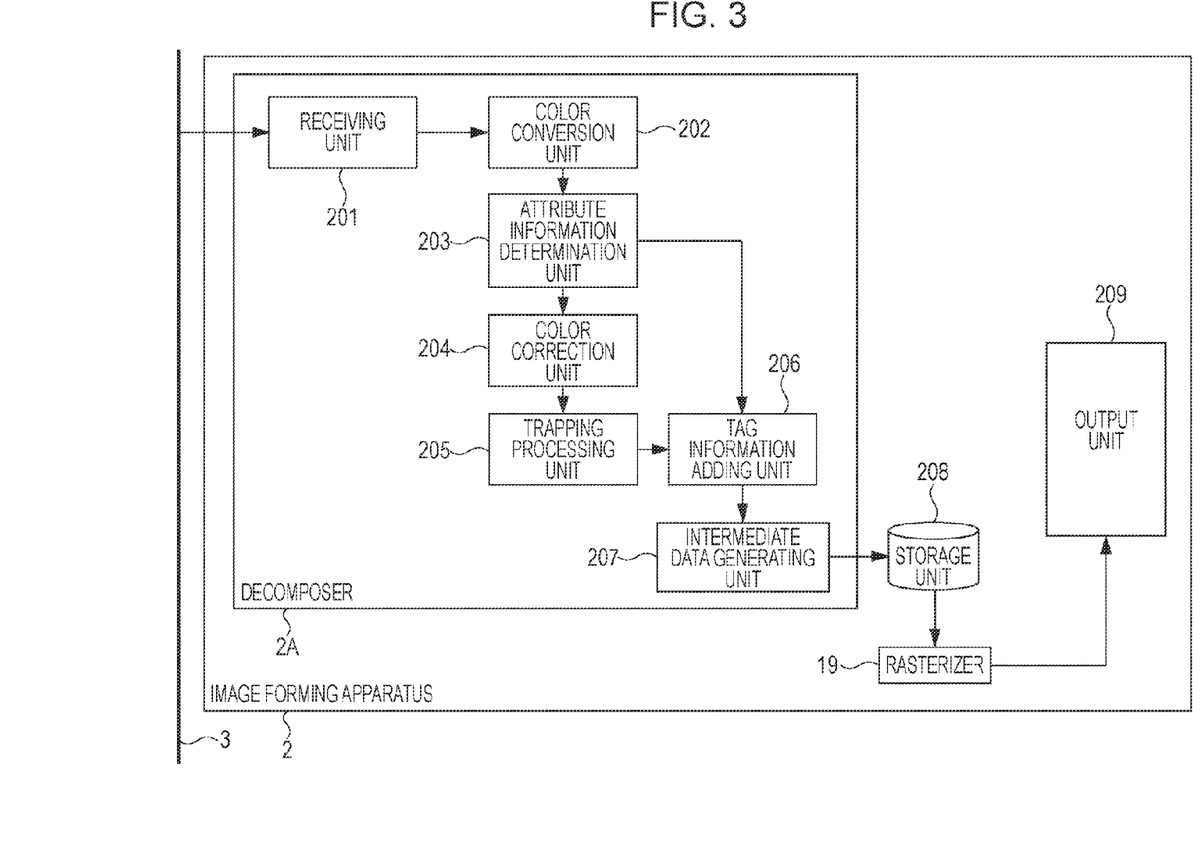
FIG. 3 illustrates a functional configuration of the image forming apparatus according to the exemplary embodiment of the present invention.

FIG. 3 illustrates a functional configuration of the image forming apparatus 2, which is realized when the control program stored in the memory 12 or the storage device 13 is executed by the CPU 11.

As illustrated in FIG. 3, the image forming apparatus 2 according to the present exemplary embodiment includes a decomposer 2A (image processing unit), a storage unit 208, and an output unit 209.

The decomposer 2A includes a receiving unit 201, a color conversion unit 202, an attribute information determination unit 203, a color correction unit 204, a trapping processing unit 205, a tag information adding unit 206, and the intermediate data generating unit 207.

In the image forming apparatus 2 according to the present exemplary embodiment, in order to increase the speed of image processing by reducing the workload processed by the decomposer 2A, which functions as software when the control program is executed by the CPU 11, the image processing is distributed by using the rasterizer 19 (rendering unit), which is hardware designed exclusively for rendering, as a hardware accelerator.

The receiving unit 201 receives print data that includes plural pieces of image data transmitted from the terminal apparatus 1.

The color conversion unit 202 converts the color space of the pieces of image data, which are included in the print data received by the receiving unit 201, into a different color space. For example, when the pieces of image data included in the print data received by the receiving unit 201 are represented in a red, green, and blue (RGB) color space, color conversion is performed on the pieces of image data so that the pieces of image data are represented in a cyan, magenta, yellow, and black (CMYK) color space.

Boundary portions of adjacent images are superposed with each other by a trapping process. For each of the pieces of image data included in the print data received by the receiving unit 201, the attribute information determination unit 203 determines whether or not trapping attribute information is attached. The trapping attribute information indicates that the trapping process is to be performed on the piece of image data.

When the attribute information determination unit 203 has determined that the trapping attribute information is attached to the piece of image data, the color correction unit 204 performs color correction on the piece of image data.

The trapping processing unit 205 performs the trapping process on the piece of the image data on which the color correction has been performed by the color correction unit 204. The specific details of the trapping process will be described later.

The tag information adding unit 206 adds tag information to each of the plural pieces of image data included in the print data. The tag information includes information indicative of whether or not the color correction has been performed on the piece of image data by the color correction unit 204.

The intermediate data generating unit 207 generates intermediate data in accordance with the print data that includes the pieces of image data on which the trapping process has been performed by the trapping processing unit 205.

The storage unit 208 stores the intermediate data generated by the intermediate data generating unit 207.

Then, the rasterizer 19 performs an image rendering process in accordance with the intermediate data stored in the storage unit 208, and the rendered image is output by the output unit 209. The specific details of the rasterizer 19 will be described later.

The output unit 209 outputs the image, which has been rendered by the rasterizer 19, to a sheet of paper.

Next, an example of the trapping process and an example of processing up to generation of the intermediate data performed by the decomposer 2A according to the present exemplary embodiment are described in detail with reference to FIGS. 4A to 6.

Figure 4A:
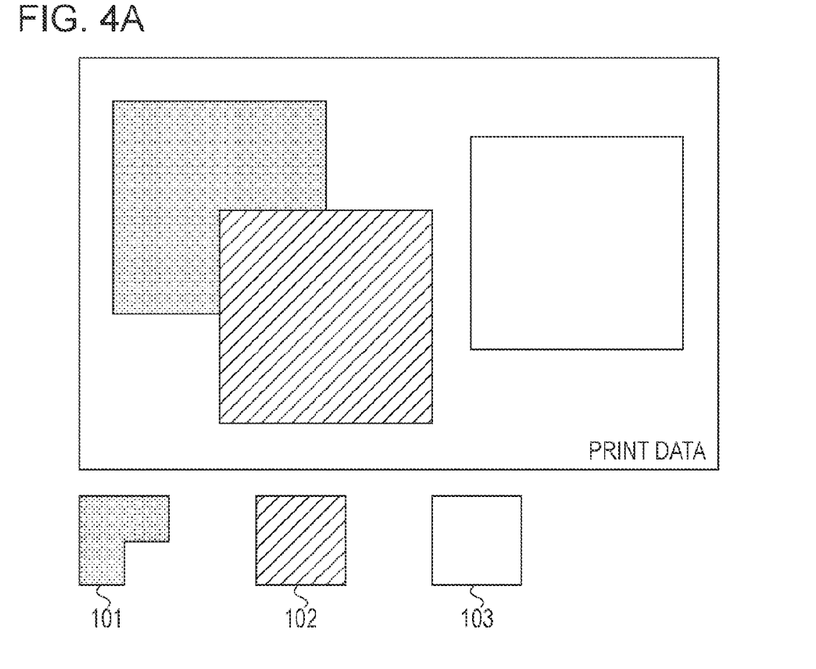
FIGS. 4A and 4B illustrate an example of a trapping process according to the exemplary embodiment of the present invention.

As illustrated in FIG. 4A, print data, which is initially created in the terminal apparatus 1, includes pieces of image data such as rear image 101 data, front image 102 data, and normal image 103 data. The rear image 101 and the front image 102 are adjacent to each other. At this time, an instruction for performing the trapping process on the rear image 101 data and the front image 102 data is input by, for example, a user operation in the terminal apparatus 1.

In the terminal apparatus 1, trapping attribute information, which indicates that the trapping process is to be performed, is attached to the rear image 101 data and the front image 102 data, which have been determined to be subjected to the trapping process.

Figure 4B:
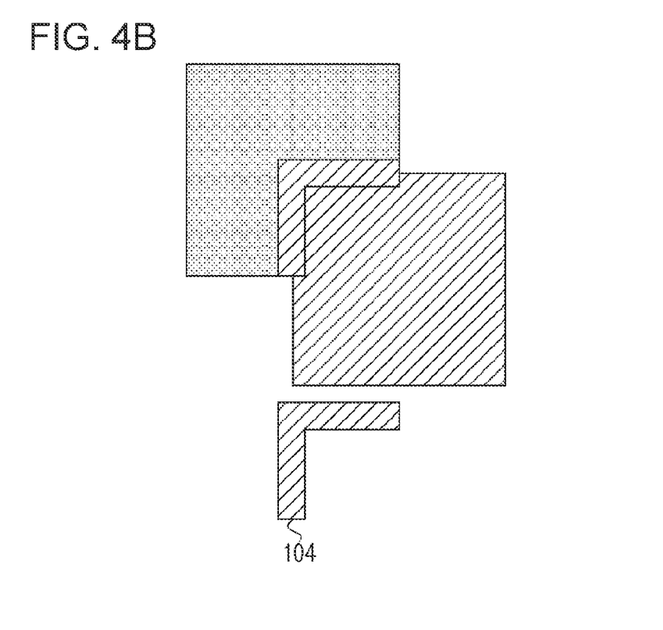

The rear image 101 data and the front image 102 data, to which it has been determined that the trapping attribute information has been attached by the attribute information determination unit 203, are subjected to the color correction performed by the color correction unit 204. After that, the trapping processing unit 205 performs a process that causes the boundary portions of the rear image 101 and the front image 102 to be superposed with each other as illustrated in FIG. 4B. In the present embodiment, a trapping object 104 is located in a boundary portion between the rear image 101 and the front image 102 by the trapping processing unit 205. The trapping object 104 has a color created by mixing the color of the rear image 101 and the color of the front image 102. In the present embodiment, the above-described process performed by the trapping processing unit 205 is referred to as the trapping process.

The tag information adding unit 206 adds tag information that includes information indicating that the color correction has been performed on each piece of image data on which the trapping process has been performed as described above.

Figure 5:
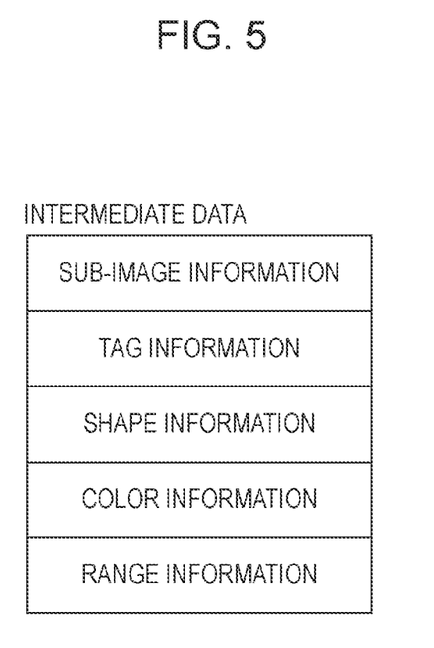
FIG. 5 illustrates an example of intermediate data according to the exemplary embodiment of the present invention.

Next, the intermediate data generating unit 207 generates intermediate data as illustrated in FIG. 5. Specifically, the intermediate data generating unit 207 generates intermediate data for each of the pieces of image data in accordance with the print data. The intermediate data includes the following information: sub-image information indicative of how many sub-images are included, tag information having been added, shape information indicative of the shape of the piece of image data, color information of the piece of the image data, and a range information indicative of the range of the piece of the image data.

Since the trapping attribute information is not attached to the normal image 103 in the terminal apparatus 1, the normal image 103 data is not subjected to the color correction performed by the color correction unit 204, and tag information, which includes information indicating that the color correction has not been performed on the normal image 103, is added by the tag information adding unit 206.

Figure 6:
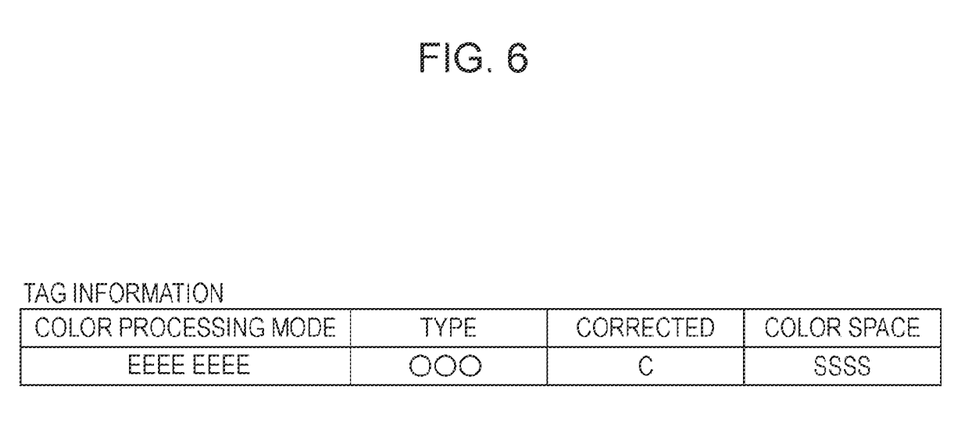
FIG. 6 illustrates an example of tag information according to the exemplary embodiment of the present invention.

As the tag information according to the present exemplary embodiment, 16-bit information as illustrated in FIG. 6 is added by the tag information adding unit 206. The 16-bit information includes a piece of information indicative of a color processing mode of the piece of image data (E), a piece of information indicative of the type of the piece of image data, a piece of information indicative of whether or not the color correction has been performed on the piece of image data, and a piece of information indicative of the color space of the piece of image data.

Next, the configuration of the rasterizer 19 is described in detail with reference to FIG. 7.

Figure 7:
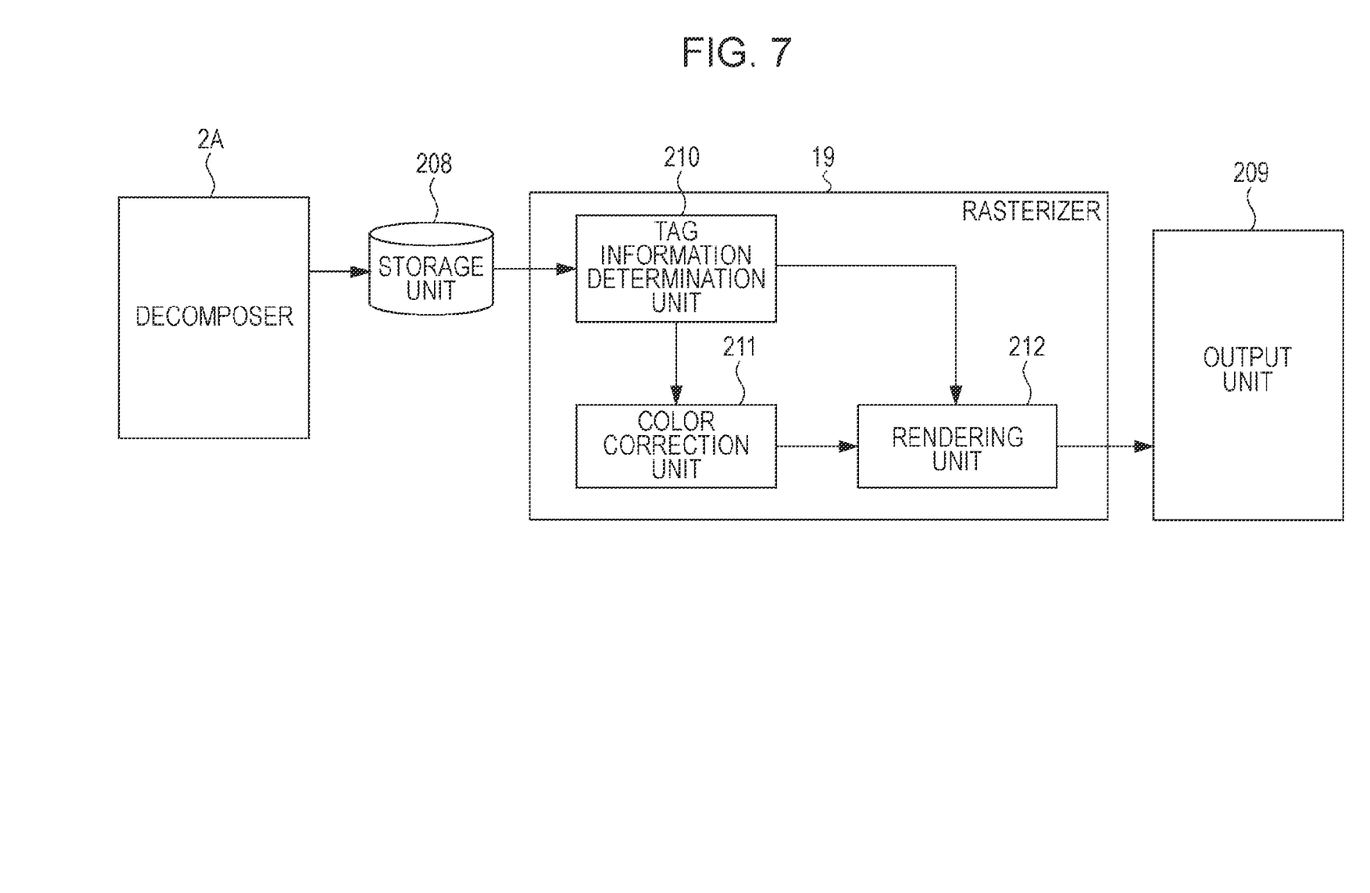
FIG. 7 is a block diagram illustrating a configuration of a rasterizer according to the exemplary embodiment of the present invention.

As illustrated in FIG. 7, the rasterizer 19 includes a tag information determination unit 210, a color correction unit 211, and a rendering unit 212.

The tag information determination unit 210 obtains the intermediate data stored in the storage unit 208 and determines, for each of the pieces of image data included in the obtained intermediate data, whether or not the tag information that includes information indicating that the color correction has not been performed on the piece of image data.

The color correction unit 211 performs the color correction for each piece of the image data, to which it has been determined by the tag information determination unit 210 that the tag information, which includes information indicating that the color correction has not been performed, has been added.

The rendering unit 212 performs a rendering process for the following pieces of image data: the pieces of image data on which the color correction has been performed by the color correction unit 211; and the pieces of image data to which it has been determined by the tag information determination unit 210 that the tag information, which includes information indicating that the color correction has been performed, has been added. The rendering unit 212 causes the output unit 209 to output the image having undergone the rendering process to a sheet of paper or the like.

Figure 8:
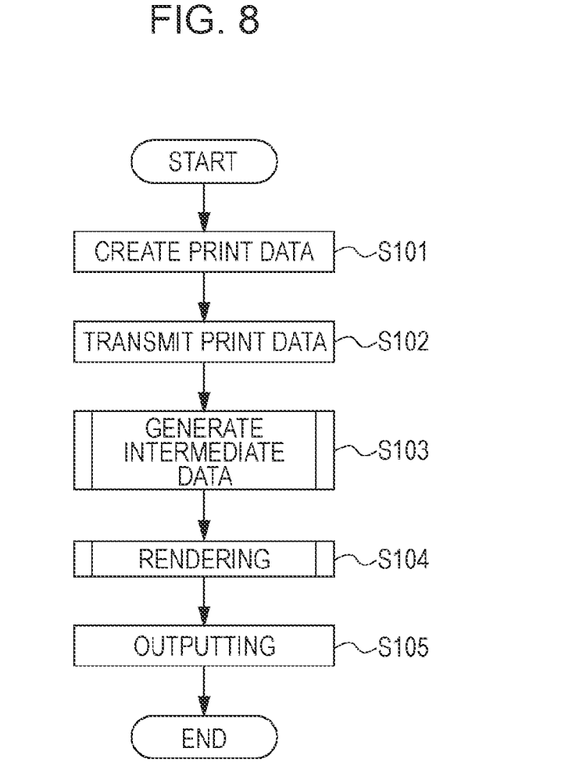
FIG. 8 is a flowchart illustrating general processing of the image forming system according to the exemplary embodiment of the present invention.

Next, general processing of the image forming system according to the present exemplary embodiment is described with reference to a flowchart illustrated in FIG. 8.

Initially, print data that includes plural pieces of image data is created in the terminal apparatus 1 (step S101). In the present exemplary embodiment, the terminal apparatus 1 creates print data that includes pieces of image data represented in the RGB color space. As described above, in the terminal apparatus 1, the trapping attribute information is attached to the pieces of image data on which the trapping process is to be performed.

Next, the terminal apparatus 1 transmits the print data having been created to the image forming apparatus 2 via the network 3 (step S102).

The image forming apparatus 2 generates the intermediate data in accordance with the print data having been transmitted thereto (step S103). The details of processes of creating the intermediate data will be described later.

Next, the rasterizer 19 performs the rendering process in accordance with the intermediate data generated in step S103 (step S104). The details of the rendering process will be described later.

The output unit 209 outputs an image, which has been rendered by the rasterizer 19, to a sheet of paper (step S105).

Figure 9:
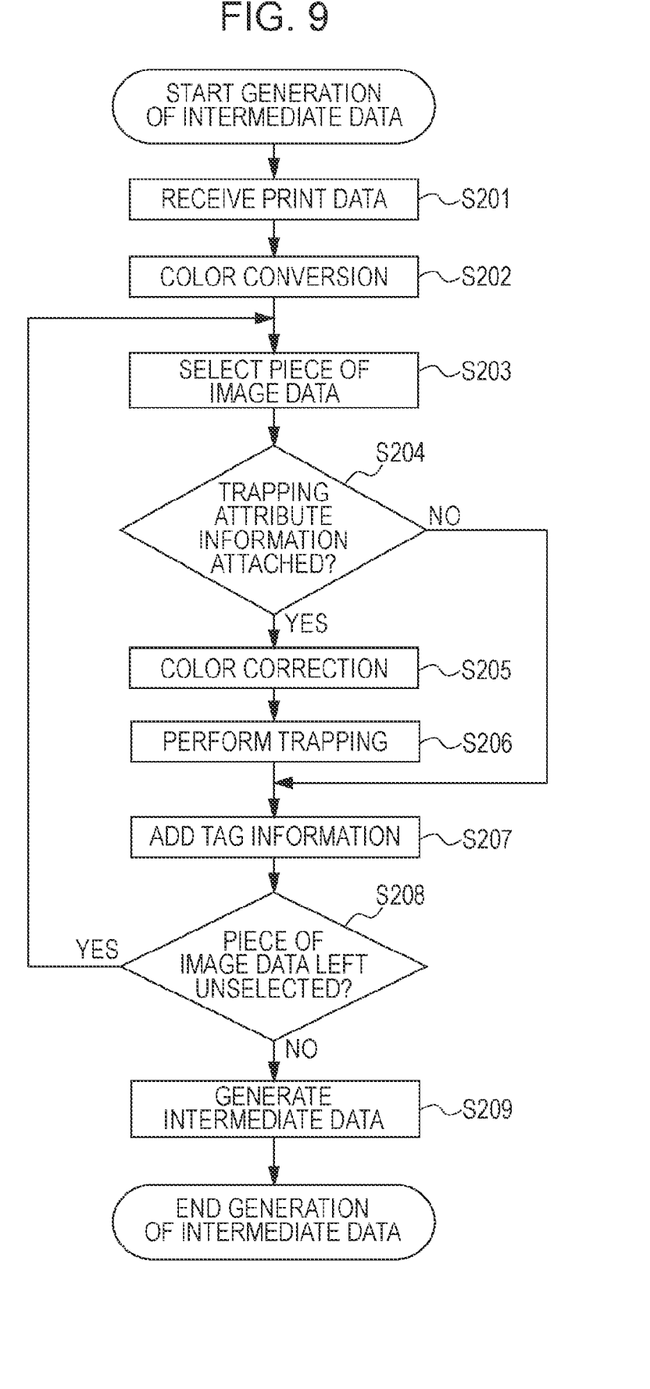
FIG. 9 is a flowchart illustrating processes in which intermediate data is generated according to the exemplary embodiment of the present invention.

Next, the processes for generating the intermediate data performed in step S103 is described in detail with reference to a flowchart illustrated in FIG. 9.

Initially, the receiving unit 201 receives the print data transmitted from the terminal apparatus 1 via the network 3 (step S201).

The color conversion unit 202 performs color conversion on the pieces of image data, which are included in the print data received by the receiving unit 201 (step S202).

Next, the attribute information determination unit 203 selects one of the pieces of image data out of the pieces of image data included in the print data having been received by the receiving unit 201 (step S203).

The attribute information determination unit 203 determines whether or not the trapping attribute information is attached to the selected piece of the image data (step S204).

When the attribute information determination unit 203 determines that the trapping attribute information is attached to the selected piece of image data (YES in step S204), the color correction unit 204 performs the color correction on the piece of image data, for which it has been determined that the trapping attribute information is attached (step S205).

Next, the trapping processing unit 205 performs the trapping process on the piece of image data, on which the color correction has been performed by the color correction unit 204 (step S206).

Next, the tag information adding unit 206 adds the tag information, which includes information that the color correction has been performed, to the piece of image data, on which the color correction has been performed by the color correction unit 204 (step S207). When the attribute information determination unit 203 determines that the trapping attribute information is not attached to the selected piece of image data (NO in step S203), the tag information adding unit 206 adds the tag information that includes information indicating that the color correction has not been performed.

When at least one piece of image data included in the print data having been received by the receiving unit 201 is left unselected, processing returns to the step S203 and the above-described processes are repeated. When all the pieces of the image data have been selected, the processing advances to step S209 (step S208).

When all the pieces of image data have been selected (NO in step S208), the intermediate data generating unit 207 generates intermediate data in accordance with the print data that includes the pieces of image data, on which the trapping process has been performed by the trapping processing unit 205. The intermediate data generating unit 207 causes the generated intermediate data to be stored in the storage unit 208 (step S209).

Figure 10:
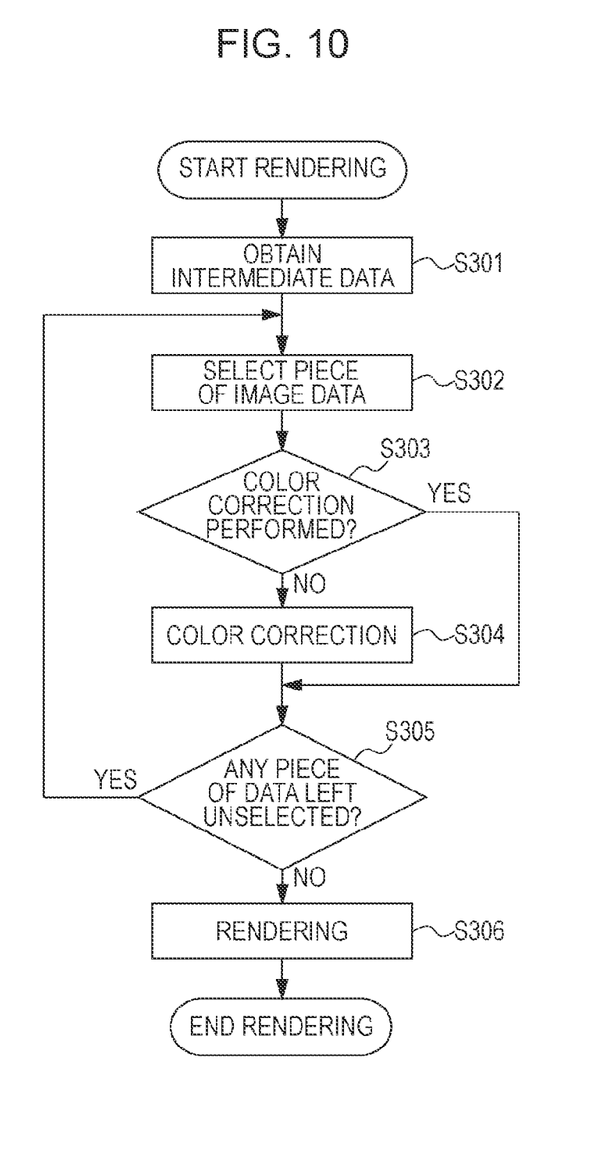
FIG. 10 is a flowchart illustrating a rendering process according to the exemplary embodiment of the present invention.

Next, the rendering process performed in step S104 is described in detail with reference to a flowchart illustrated in FIG. 10.

Initially, the tag information determination unit 210 obtains the intermediate data stored in the storage unit 208 (step S301).

The tag information determination unit 210 selects a piece of image data, the tag information of which is to be referred to, from the pieces of image data included in the obtained intermediate data (step S302).

Next, the tag information determination unit 210 refers to the tag information added to the selected piece of image data and determines whether or not the added tag information includes information indicating that the color correction has been performed (step S303).

When the tag information determination unit 210 determines that the information indicating that the color correction has been performed is included in the tag information of the selected piece of image data (YES in step S303), the processing advances to step S305.

When the tag information determination unit 210 determines that the information indicating that the color correction has not been performed is included in the tag information of the selected piece of image data (NO in step S303), the color correction unit 211 performs the color correction on the selected piece of image data (step S304).

Whether or not at least a piece of image data in the intermediate data is left unselected is determined (step S305). When at least a piece of image data in the intermediate data is left unselected (YES in step S305), the processing returns to step S302 and the above-described processes are repeated.

When there is no unselected piece of image data in the intermediate data (NO in step S305), the rendering unit 212 performs the rendering process for the pieces of image data, on which the color correction has been performed by the color correction unit 211, and the pieces of image data to which it has been determined by the tag information determination unit 210 that the tag information, which includes information indicating that the color correction has been performed, has been added (step S306).

Next, specific examples of the above-described processes performed by the image forming apparatus 2 are described in detail with reference to FIGS. 11A to 13B.

Before describing the specific examples of the processes performed by the image forming apparatus 2 in the present exemplary embodiment, image processing performed with a hardware accelerator is described. In this processing, the trapping process is performed without the configuration of the present invention.

In image processing using the decomposer 2A that generates the intermediate data and the rasterizer 19 that serves as a hardware accelerator, in order to perform the trapping process on the pieces of image data included in the print data, the trapping process needs to be performed before the intermediate data is generated by the decomposer 2A.

Furthermore, since a large workload is processed by the color correction process, a good result may be obtained by distributing the image processing so as to cause the color correction process to be performed by the rasterizer 19 rather than by the decomposer 2A.

Figure 11A:
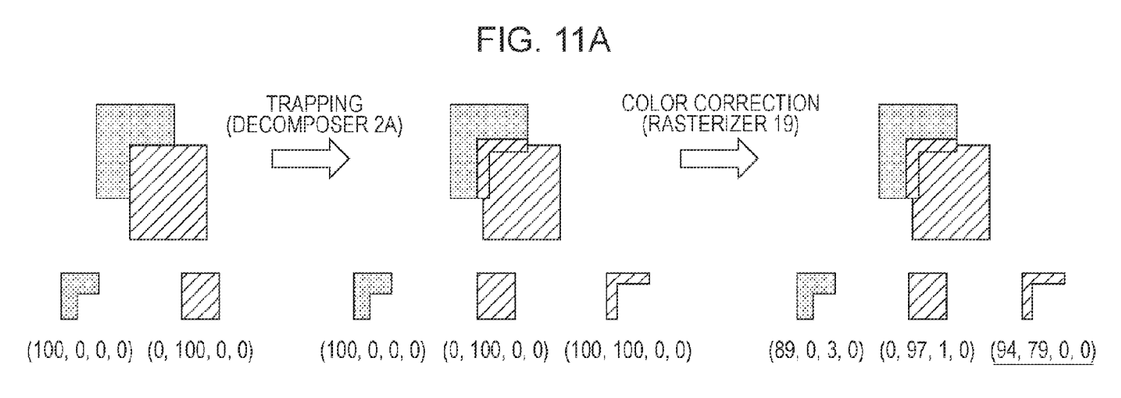
FIGS. 11A and 11B are schematic views for illustrating specific processes performed on pieces of image data according to the exemplary embodiment of the present invention.

Referring to FIG. 11A, a case in which the color correction process is performed by the rasterizer 19 is described. In this case, the color correction is performed by the rasterizer 19 after the trapping process has been performed by the decomposer 2A while the color correction process is not performed by the decomposer 2A.

Figure 12A:
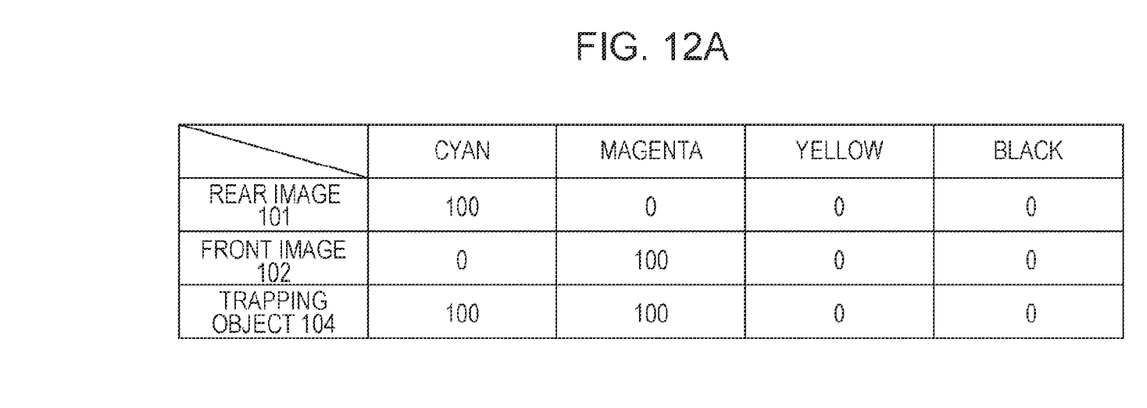
FIGS. 12A and 12B illustrate examples of color values of the pieces of image data before and after color correction when a color correction process is performed by the rasterizer.

In the case where these processes are performed in the order as illustrated in FIG. 11A, for example, when the trapping process has been performed by the decomposer 2A, the color value of the rear image 101 (C1, M1, Y1, K1) before the color correction is (100, 0, 0, 0) and the color value of the front image 102 (C2, M2, Y2, K2) before the color correction is (0, 100, 0, 0) as illustrated FIG. 12A. The trapping object 104, the color value of which is the sum of those of the rear image 101 and the front image 102, that is, (100, 100, 0, 0), is located at the boundary portion between the rear image 101 and the front image 102 by the decomposer 2A.

Figure 12B:
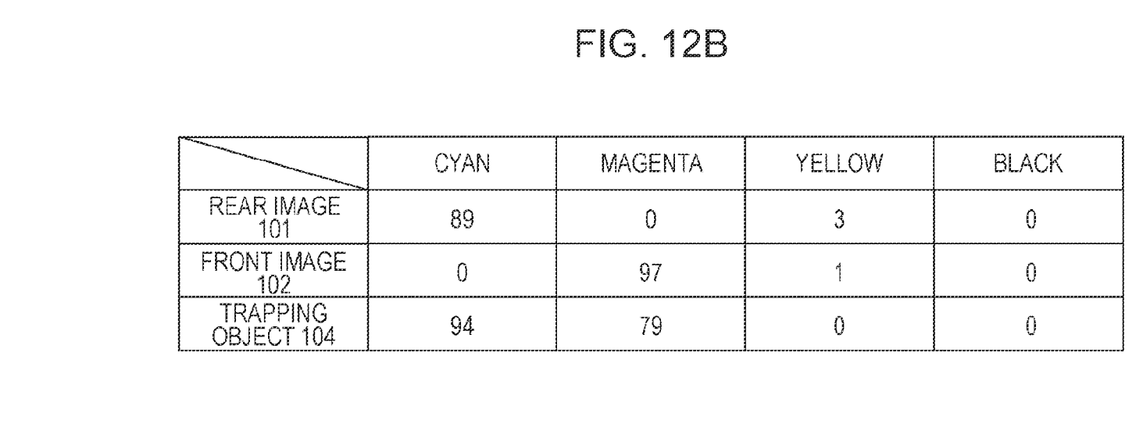

When the color correction is performed by the rasterizer 19, as illustrated in FIG. 12B, the trapping object 104 of the color value (94, 79, 0, 0) is rendered. This color value is different from the sum of the color value (89, 0, 3, 0) of the rear image 101 after the color correction and the color value (0, 97, 1, 0) of the front image 102 after the color correction. The reason for this is that, in order to perform the color correction on image data, a color value is replaced with a different color value corresponding to the color value before the correction. Thus, for example, even in the case where the values of C, M, and Y are unchanged, when the value of K is changed, the C, M, and Y values after the correction are different from those before the correction.

Because of the above-described problem, in the case where the trapping process is performed on the pieces of image data included in print data with the hardware accelerator, the color correction needs to be performed on the pieces of image data to be subjected to the trapping process before the trapping process is performed. However, when the color correction is performed on the pieces of image data included in the print data by the decomposer 2A, the workload processed by the decomposer 2A is increased, and accordingly, the processing speed of image processing is generally reduced.

Next, the specific examples of the processes performed by the image forming apparatus 2 in the present exemplary embodiment are described.

Figure 11B:
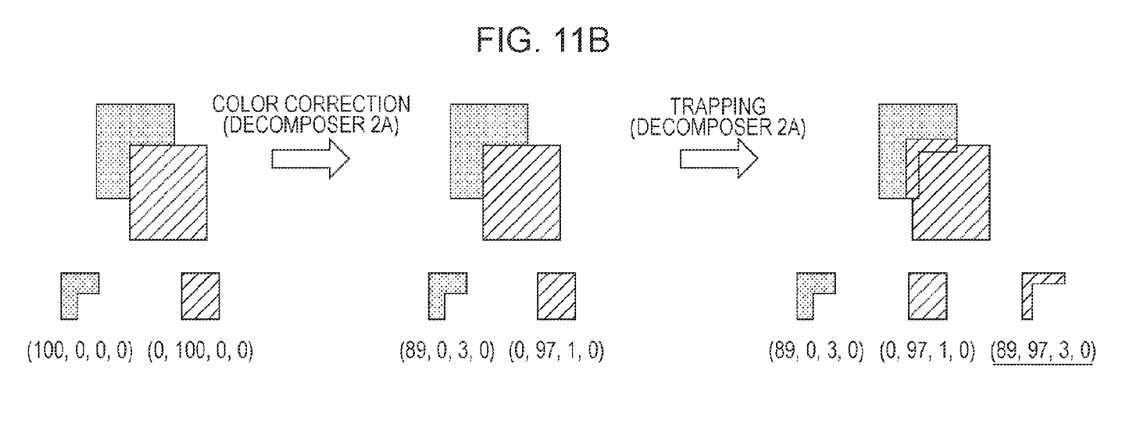

As illustrated in FIG. 11B, in the present exemplary embodiment, the decomposer 2A performs the trapping process after performing the color correction only on the pieces of image data to be subjected to the trapping process.

Figure 13A:
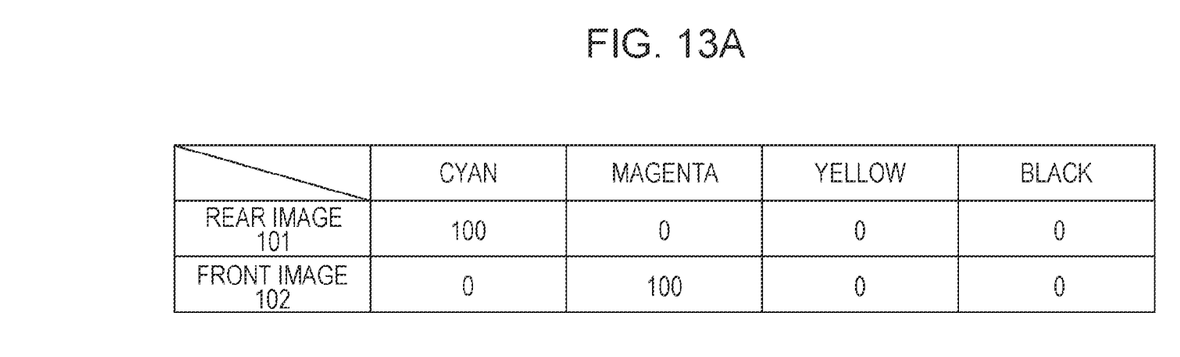
FIGS. 13A and 13B illustrate examples of color values of the pieces of image data before and after the color correction according to the exemplary embodiment of the present invention.

For example, as illustrated in FIG. 13A, when the color value (C1, M1, Y1, K1) of the rear image 101 is (100, 0, 0, 0) and the color value (C2, M2, Y2, K2) of the front image 102 is (0, 100, 0, 0), and the color correction is performed on the rear image 101 and the front image 102, the color values are changed as follows: the color value of the rear image 101 after the correction is (89, 0, 3, 0) and the color value of the front image 102 after the correction is (0, 97, 1, 0).

Figure 13B:
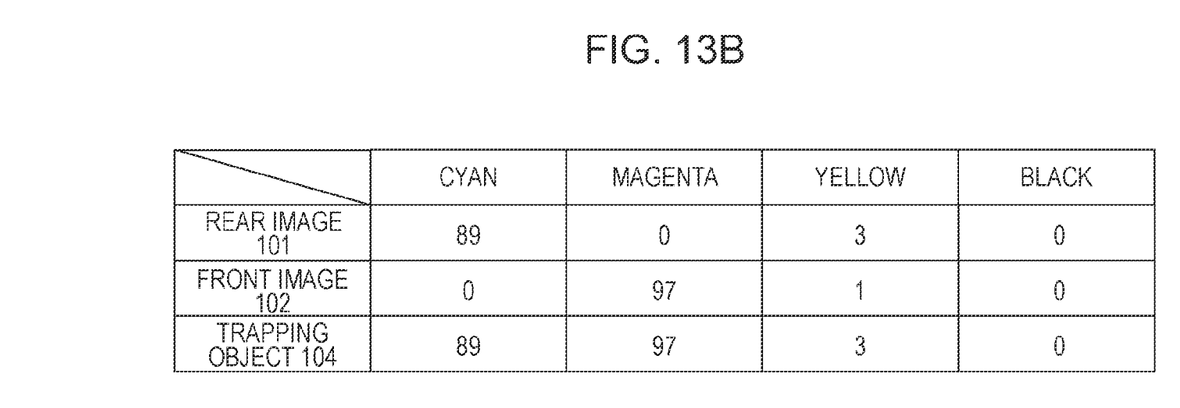

After the color correction has been performed as described above, the trapping object 104, the color value (89, 97, 3, 0) of which is the sum of those of the rear image 101 and the front image 102 after the correction as illustrated in FIG. 13B, is located at the boundary portion between the rear image 101 and the front image 102 by the decomposer 2A.

The rasterizer 19 performs the rendering process after performing the color correction process on the pieces of image data, on which the color correction process has not been performed, in accordance with the intermediate data generated after the trapping process as described above has been performed.

As described above, in the present exemplary embodiment, only the pieces of image data to be subjected to the trapping process undergo the color correction and then the trapping process performed by the decomposer 2A, and the pieces of image data not to be subjected to the trapping process undergo the color correction performed by the rasterizer 19. Thus, in the present exemplary embodiment, the color of the trapping object 104 rendered by the rasterizer 19 is rendered in a color obtained by adding the color of the rear image 101 and the color of the front image 102.

Also in the present exemplary embodiment, the pieces of image data not to be subjected to the trapping process undergo the color correction performed by the rasterizer 19. This reduces the workload processed by the decomposer 2A.

Although the print data created in the terminal apparatus 1 includes the pieces of the image data represented in the RGB color space in the present exemplary embodiment, the print data created in the terminal apparatus 1 may include the pieces of image data represented in the CMYK color space. In this case, the color conversion process performed by the color conversion unit 202 of the decomposer 2A may be omitted.

Although the tag information includes the piece of information indicative of the color processing mode of the piece of image data, the piece of information indicative of the type of the piece of image data, and the piece of information indicative of the color space of the piece of image data in the present exemplary embodiment, the tag information may alternatively include any one of the above-described pieces of information. Alternatively, the tag information may include only the information indicative of whether or not the color correction has been performed on the piece of image data.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image processing unit; and
   a rendering unit,
   wherein the image forming apparatus performs a trapping process that, when print data includes a plurality of pieces of image data, causes boundary portions of the adjacent pieces of image data to be superposed with one another,
   wherein the image processing unit includes
      a determination unit that determines whether or not trapping attribute information, which indicates that the trapping process is to be performed, is attached to the pieces of image data on a piece by piece basis,
      a color correction unit that performs color correction on the pieces of image data, for which it has been determined by the determination unit that the trapping attribute information is attached,
      a processing unit that performs the trapping process on the pieces of image data, on which the color correction has been performed by the color correction unit,
      an adding unit that adds tag information, which includes a piece of information indicating whether or not the color correction has been performed by the color correction unit, to each of the plurality of pieces of image data included in the print data, and
      a generating unit that generates intermediate data in accordance with the print data that includes the pieces of image data, on which the trapping process has been performed by the processing unit, and
   wherein the rendering unit refers to the tag information of each of the pieces of image data in the intermediate data generated by the intermediate data generating unit, performs the color correction on one or more of the pieces of image data to which the tag information, which includes the piece of information indicating that the color correction has not been performed, has been added, and performs a rendering process on the one or more of the pieces of image data on which the color correction has been performed and on the pieces of image data to which the tag information, which includes the piece of information indicating that the color correction has been performed, has been added.

2. The image forming apparatus according to claim 1, further comprising:
   an output unit that outputs the pieces of image data on which the rendering process has been performed by the rendering unit.

3. The image forming apparatus according to claim 1, wherein the image processing unit further includes
   a color conversion unit that converts a color space of each of the pieces of image data included in the print data into a different color space.

4. The image forming apparatus according to claim 1, wherein the tag information of each of the pieces of data further includes at least one of a piece of information that indicates a color space of the piece of image data, a piece of information that indicates a type of the piece of image data, and a piece of information that indicates a color processing mode for the piece of image data.

* * * * *